(12) United States Patent
McLaren et al.

(10) Patent No.: US 8,705,911 B2
(45) Date of Patent: Apr. 22, 2014

(54) BUS-BASED SCALABLE OPTICAL FABRICS

(75) Inventors: Moray McLaren, Bristol (GB); Michael Renne Ty Tan, Menlo Park, CA (US); Gary Gostin, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 13/258,425

(22) PCT Filed: May 6, 2009

(86) PCT No.: PCT/US2009/002798
§ 371 (c)(1),
(2), (4) Date: Sep. 21, 2011

(87) PCT Pub. No.: WO2010/128958
PCT Pub. Date: Nov. 11, 2010

(65) Prior Publication Data
US 2012/0020663 A1  Jan. 26, 2012

(51) Int. Cl.
*G02B 6/28* (2006.01)
*H04J 14/00* (2006.01)
*G02B 6/293* (2006.01)

(52) U.S. Cl.
CPC .............. *G02B 6/2852* (2013.01); *G02B 6/28* (2013.01); *G02B 6/2938* (2013.01); *G02B 6/29382* (2013.01); *G02B 6/29383* (2013.01)
USPC ................................ 385/24; 398/68; 398/73

(58) Field of Classification Search
CPC ...... G02B 6/28; G02B 6/2804; G02B 6/2817; G02B 6/2852; G02B 6/2861; G02B 6/2938; G02B 6/39382; G02B 6/29383; G02B 6/29385

USPC ................. 385/24; 398/66–68, 70, 73, 82, 91
See application file for complete search history.

(56) References Cited

U.S. PATENT DOCUMENTS

| | | | |
|---|---|---|---|
| 5,465,379 A | | 11/1995 | Li et al. |
| 5,724,343 A | * | 3/1998 | Pain et al. ..................... 370/242 |
| 6,111,885 A | * | 8/2000 | Stewart ......................... 370/438 |
| 6,567,579 B2 | * | 5/2003 | Foltzer ............................ 385/24 |
| 6,671,712 B1 | * | 12/2003 | Arimilli et al. ................ 709/201 |

(Continued)

FOREIGN PATENT DOCUMENTS

| | | | | |
|---|---|---|---|---|
| WO | WO 9307569 A1 | * | 4/1993 | ............. G06F 13/40 |
| WO | WO-0135137 | | 5/2001 | |

OTHER PUBLICATIONS

Aly, Khaled A. "Large-scale passive photonic switch architecture." Southcon/94. Conference Record, pp. 445-450. IEEE, 1994.

(Continued)

*Primary Examiner* — Rhonda Peace

(57) ABSTRACT

Various embodiments of the present invention are directed to arrangements of multiple optical buses to create scalable optical interconnect fabrics for computer systems. In one aspect, a multi-bus fabric (102) for transmitting optical signals between a plurality of nodes (108-111) comprises a plurality of optical buses (104-107). Each optical bus is optically coupled to each node of the plurality of nodes, and each optical bus is configured to so that one node broadcasts optical signals generated by the node to the other nodes of the plurality of nodes.

15 Claims, 17 Drawing Sheets

(56) References Cited

U.S. PATENT DOCUMENTS

| | | | |
|---|---|---|---|
| 6,865,695 B2* | 3/2005 | Joyner et al. | 714/43 |
| 6,961,259 B2* | 11/2005 | Lee et al. | 365/63 |
| 7,139,484 B2* | 11/2006 | Kurumida et al. | 398/83 |
| 7,218,640 B2 | 5/2007 | Lebizay et al. | |
| 7,576,562 B1* | 8/2009 | Whitaker et al. | 326/40 |
| 8,036,532 B2* | 10/2011 | Sakamoto et al. | 398/67 |
| 8,391,717 B2* | 3/2013 | McLaren et al. | 398/73 |
| 2002/0076143 A1* | 6/2002 | Foltzer | 385/24 |
| 2003/0033555 A1* | 2/2003 | Joyner et al. | 714/11 |
| 2005/0147414 A1 | 7/2005 | Morrow et al. | |
| 2008/0084727 A1* | 4/2008 | Norman | 365/63 |
| 2009/0097851 A1 | 4/2009 | Tan et al. | |
| 2009/0103929 A1 | 4/2009 | Binkert et al. | |
| 2009/0168797 A1* | 7/2009 | Danielson et al. | 370/458 |
| 2011/0286743 A1* | 11/2011 | McLaren et al. | 398/45 |
| 2012/0020663 A1* | 1/2012 | McLaren et al. | 398/48 |
| 2013/0058607 A1* | 3/2013 | Binkert et al. | 385/16 |
| 2013/0259483 A1* | 10/2013 | McLaren et al. | 398/79 |

OTHER PUBLICATIONS

Chen, Chin-Chou et al., "A wavelength encoded multichannel optical bus for local area networks." Lightwave Technology, Journal of 14, No. 3 (1996): 315-323.

European Search Report, EP Application No. 09844441.7, Nov. 22, 2012.

* cited by examiner

BUS-BASED SCALABLE OPTICAL FABRICS

TECHNICAL FIELD

Embodiments of the present invention related to computer systems, and, in particular, to optical interconnects.

BACKGROUND

Newly developed software and improvements to existing software continue to place ever increasing demands on processing power and memory capacity of computer systems. Typical high performance rack mounted computer systems, such as a blade system, comprise a number of processor boards and memory boards that are in electronic communication over an electronic interconnect fabric. An ideal interconnect fabric allows processors and memory to scale independently in order to reconfigure computer systems with enough memory or processing speed to meet the computational demands of the software.

DETAILED DESCRIPTION

Figure 1:
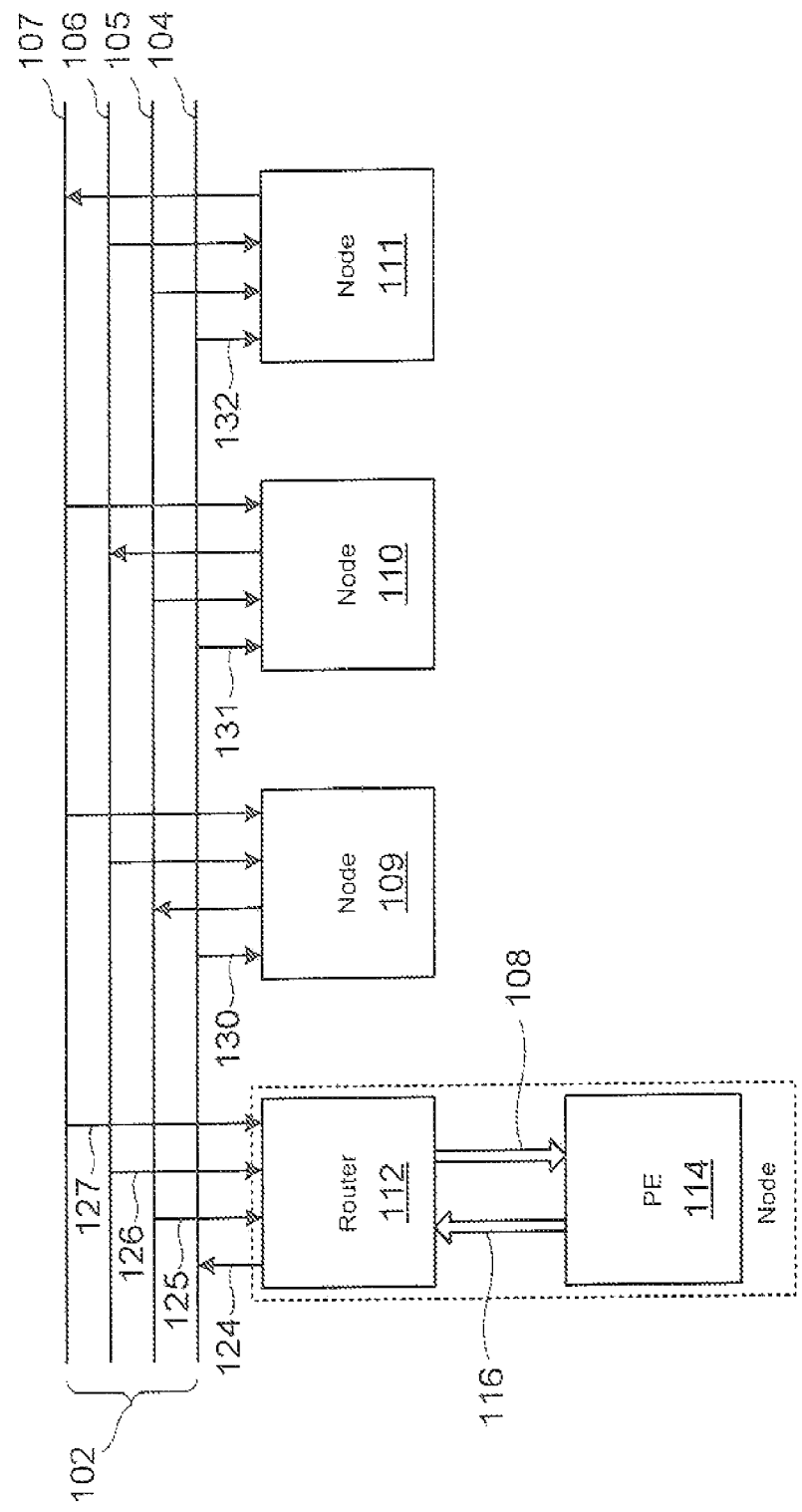
FIG. 1 shows a schematic representation of an example one-dimensional multi-bus fabric configured in accordance with embodiments of the present invention.

In practice, an interconnect fabric of a computer system provides limited scaling capacity and may not be configured to scale with the computational demands of software that may be run on the same system in the future. The speed of processors has steadily increased due to technological improvements, which has helped to address some data processing demands. In particular, developments in integrated circuit technology has shown remarkable progress in reducing the size of computer components, which has led to increases in component densities, decreases in the cross-sectional dimensions of signal lines, and increased data rates. Electronic signal line buses have traditionally been used to connect boards in interconnect fabrics, but as data rates have increased, signal integrity has diminished. As a result, the number of circuit boards in a computer system connected to a bus has decreased and in many cases buses have been replaced by point-to-point electronic interconnects. Point-to-point electronic interconnects can be used to create scalable electronic interconnect fabrics.

However, these electronic interconnect fabrics have a number of disadvantages. They can be labor intensive to set up, and sending electronic signals over conventional electronic interconnects consumes large amounts of power. In addition, it is becoming increasing difficult to scale the bandwidth of electronic interconnects, and the relative amount of time needed to send electronic signals over a conventional electronic interconnect fabric is becoming too long to take full advantage of the high-speed performance offered by smaller and faster components.

Manufacturers, designers, and users of computer systems have recognized a market for high-speed, bus-based interconnect fabrics that can be scaled to meet the ever increasing demands on computer systems without the constraints inherent in currently employed electronic interconnect fabrics.

Various embodiments of the present invention are directed to arrangements of multiple optical buses to create scalable optical interconnect fabrics for computer systems. Optical interconnect fabrics configured in accordance with embodiments of the present invention allow processors and memory of a computer system to scale independently so that the computer system can be reconfigured to meet the changing computational demands of software. In particular, optical interconnect fabric embodiments allow large numbers of processors to be interconnected at low latency and memory can be scaled efficiently in terms of power consumption and size and without adding significant latency. The optical interconnects fabrics include multiple optical buses that provide a relatively lower number of optical signal hop counts, lower power consumption, and can accommodate relatively higher data rates than conventional electronic and optical interconnect fabrics.

The detailed description of the present invention is organized as follows. A general description of optical interconnect fabric embodiments is provided in a first subsection. Implementations of optical interconnect fabrics is provided in a second subsection. Finally, a description of advantages of optical interconnect fabric embodiments is provided in a third subsection.

Optical Interconnect Fabrics

FIG. 1 shows a schematic representation of an example multi-bus optical fabric 102 configured in accordance with embodiments of the present invention. The multi-bus fabric 102 is a one-dimensional optical interconnect comprising four optical buses 104-107 that provide optical communication between four nodes 108-111. The nodes can be any combination of processors, memory controllers, servers, clusters of multi-core processing units, circuit boards, external network connections, or any other data processing, storing, or transmitting device. For example, the node 108 includes a router 112 in electronic communication with a processing element ("PE") 114. The PE 114 can be a single processor or a multi-core processor and includes local memory. In FIG. 1, directional arrows, such as arrows 124-127, represent optical signals sent between the nodes 108-111 and the optical buses 104-107. The optical buses 104-107 include four separate fabric ports for transmitting the optical signals between the nodes 108-111 and the optical buses 104-107. Each node is in optical communication with one of the optical buses for broadcasting optical signals and is in optical communication with the remaining three optical buses for receiving optical signals that are broadcast from the other three nodes. In other words, each node broadcasts the optical signals to the other nodes over an associated optical bus. A broadcasting node can be referred to a master node. For example, PE 114 generates data encoded in electronic signals 116 that are sent to router 112. The router 112, in this embodiment, includes a transceiver described below with reference to FIG. 2 that converts the electronic signals into optical signals encoding the same information and sends the optical signals 124 to the optical bus 104. The optical bus 104 broadcast the optical signals received from the node 108 to each of the nodes 109-111, as indicated by directional arrows 130-132. As shown in the example of FIG. 1, nodes 109-111 broadcast optical signals in the same manner on corresponding optical buses 105-107, respectively. Directional arrows 125-127 represent optical signals node 108 receives from nodes 109-111, respectively. Node 108 converts the data encoded in the optical signals into electronic signals for processing.

Figure 2:
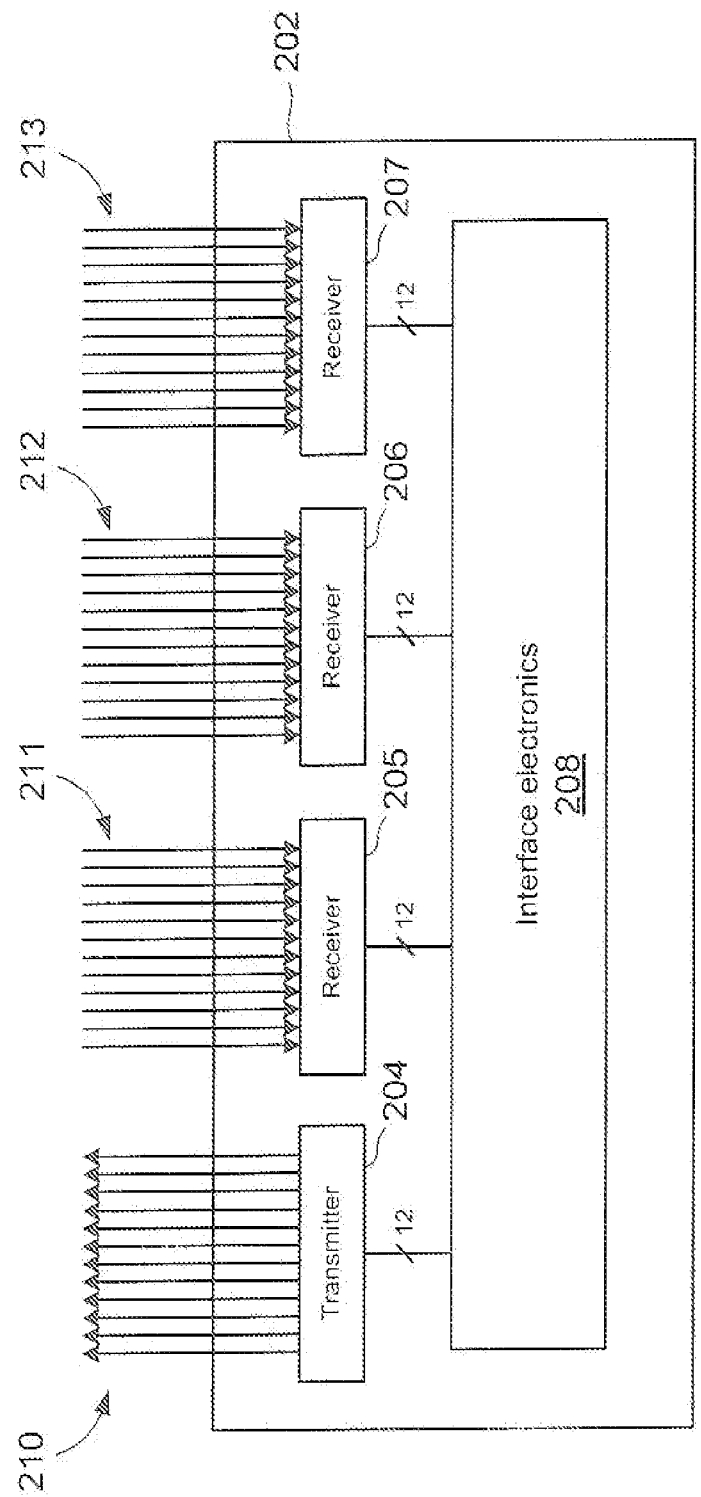
FIG. 2 shows a schematic representation of an example transceiver configured in accordance with embodiments of the present invention.

Each of the nodes 108-111 includes a transceiver (not shown in FIG. 1) for sending and receiving optical signals. In certain embodiments, transceivers can be implemented as part of the router. In other embodiments, transceivers can be implemented as a separate device that is in electronic communication with the router, as described below in the Implementations subsection. FIG. 2 shows a schematic representation of an example transceiver 202 configured in accordance with embodiments of the present invention. The transceiver 202 comprises a transmitter 204, three receivers 205-207, and interface electronics 208, which are in electronic communication with the transmitter 204 and the receivers 205-207. The transmitter 204 comprises an array of light-emitting sources, such as light-emitting diodes, semiconductor lasers, or vertical cavity surface emitting lasers ("VCSELs"). In certain embodiments, the sources can be configured to emit electromagnetic radiation with approximately the same wavelength. In other embodiments, each source can be configured to emit a different wavelength providing for dense-wave division multiplexing channel spacing. In still other embodiments, the sources can be configured to emit wavelengths in wavelength ranges providing for coarse-wave division multiplexing channel spacing. The use of wavelength division multiplexing reduces the number of waveguides needed for the same number of channels. In the example shown in FIG. 2, the transmitter 204 comprises 12 sources, each of which is separately controlled by the interface electronics 208 to emit an optical signal. Directional arrows 210 each represent a separate optical signal generated by one of the 12 sources. In certain embodiments, the optical signals 210 can be sent in separate waveguides to one of the optical buses in the multi-bus fabric 102, or in other embodiments, the separate optical signals 210 can be optically coupled directly from the transmitter 204 sources into an associated optical bus as described below with reference to FIGS. 3 and 4. For example, the transceiver 202 can represent the transceiver of node 108, and the 12 optical signals 210 generated by the transmitter 204 are represented in FIG. 1 by directional arrow 124.

Each of the receivers 205-207 comprises an array of photodetectors. In the example shown in FIG. 2, the receivers 205-207 each comprise an array of 12 photodetectors. The photodetectors can be p-n junction or p-i-n junction photodetectors. Sets of arrows 211-213 each represent 12 optical signals generated by different routers in the same manner the optical signals are generated by the transmitter 204. For example, the transceiver 202 can represent the transceiver of node 108 in FIG. 1, and the sets of optical signals 211-213 sent to receivers 205-207 are represented in FIG. 1 by directional arrows 125-127, respectively. In certain embodiments, each optical signal can be carried to a photodetector of a receiver via a separate waveguide. In other embodiments, each optical signal can be optically coupled directly from the associated optical bus to a photodetector of a receiver.

Interface electronics 208 electronically couple the transmitter 204 and receiver 205-207 to the electronic components of a corresponding node. The interface electronics 208 may include drivers for operating the light-emitting sources of the transmitter 204 and may include amplifiers for amplifying the electronic signals generated by the photodetectors of the receivers 205-207. The interface electronics 208 receive electronic signals from the node and send the electronic signals to the transmitter 204 to generate optical signals. The waveguides 211-213 direct separate optical signals to the photodetectors of the receivers 205-207. The separate optical signals are converted into separate corresponding electronic signals that are sent to the interface electronics 208, which sends the electronic signals to the node.

Returning to FIG. 1, the optical buses 104-107 are each configured with a number of separate waveguides and optical taps for broadcasting the optical signals generated by one node the other three nodes. In particular, the multi-bus fabric 102 can be configured so that the optical signals broadcast by any one node and received by the other three nodes arrive with approximately the same optical power.

Figure 3:
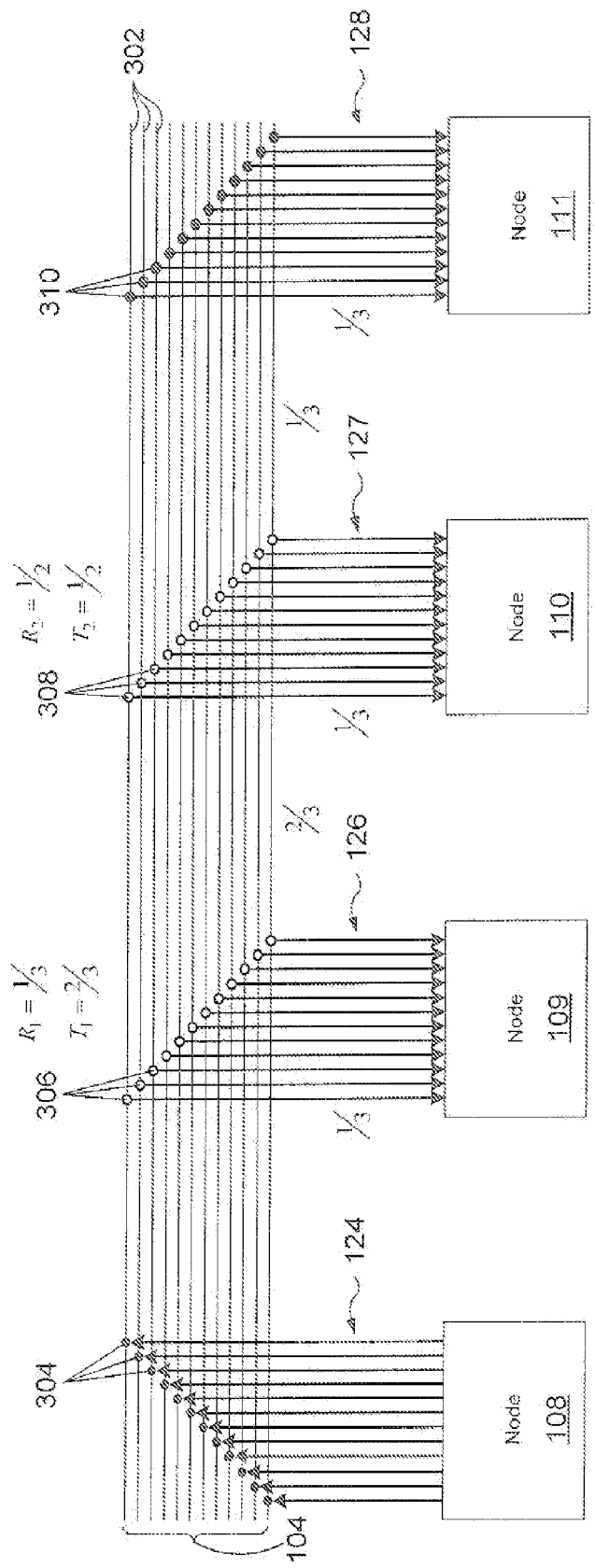
FIG. 3 shows a schematic representation of an example optical bus optically coupled to four nodes in accordance with embodiments of the presenting invention.

FIG. 3 shows a schematic representation of the optical bus 104 optically coupled to the nodes 108-111, shown in FIG. 1, in accordance with embodiments of the presenting invention. The optical bus 104 comprises 12 separate waveguides 302. FIG. 3 reveals that each of the optical signals 124, shown in FIG. 1, is optically coupled via a reflective device 304, such as a mirror, to one of the waveguides 302 in the optical bus 104. Wavelength division multiplexing can be used to inject each of the optical signals output from the node 108 into each of the waveguides 302. FIG. 3 also reveals that the optical signals 126-128, shown in FIG. 1, are composed of 12 separate optical signals. Each of the optical signals 126 is directed from a waveguide 302 via an optical tap 306 to node 109, each of the optical signals 127 is directed from a waveguide 302 via an optical tap 308 to node 110, and each of the optical signals 128 is directed from to a waveguide 302 via a reflective device 310 to the node 111.

Figure 4:
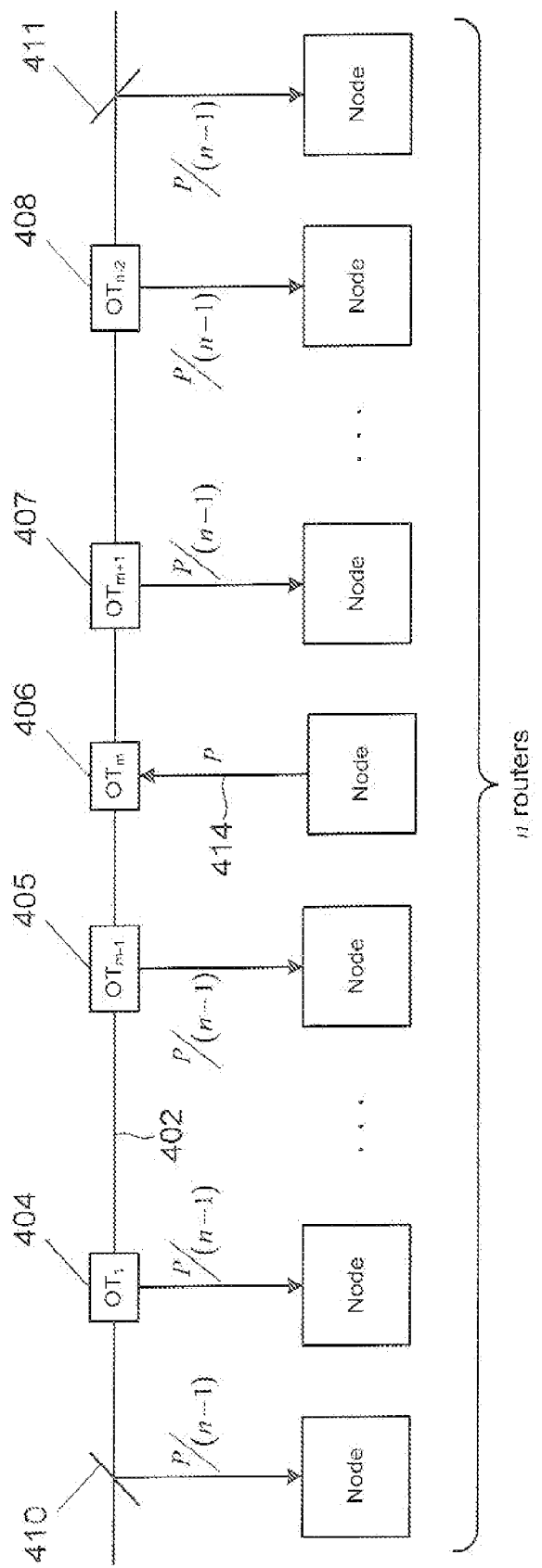
FIG. 4 shows an example of n nodes in optical communication with a waveguide of an optical bus in accordance with embodiments of the present invention.

The optical bus 104 is a fan-out bus configured to receive 12 optical signals generated by node 108 and broadcast the 12 optical signals to each of the nodes 109-111 with approximately the same optical power. In certain embodiments, the optical taps 306 can be configured to operate as ⅓:⅔ beamsplitters and optical taps 308 can be configured to operate as 50:50 beamsplitters. For example, consider the path of a single optical signal generated by the node 108. The optical signal is reflected by a mirror 304 into an optically coupled waveguide 302. An optical tap 306 reflects approximately ⅓ of the optical power of the optical signal to node 109 and approximately ⅔ of the optical power is transmitted along the same waveguide 302 to an optical tap 308. At the optical tap 308, approximately ½ of the remaining ⅔ optical power is reflected to node 110 and the remaining ⅓ of the optical power is transmitted along the same waveguide 302 through the optical tap 308 to a mirror 310 where the remaining optical signal is reflected to node 111. Thus, for each of the 12 optical signals generated by the node 108, the nodes 109-111 receive approximately ⅓ of the optical power associated with each optical signal Multi-bus fabric 102 is not limited to optically interconnecting four nodes. In other embodiments, a single one-dimensional multi-bus fabric can be configured to accommodate as few as 2 nodes and as many as 5, 6, 7, or 10 or more nodes. The maximum number of nodes is determined by the transmit power, the overall system loss and the minimum receiver sensitivity. In general, the optical taps of an optical bus are configured so that when an optical signal is broadcast by a node over the optical bus, each of the nodes receive approximately $1/(n-1)$ of the total optical power P of the optical signal. FIG. 4 shows an example of n nodes in optical communication with a waveguide 402 in accordance with embodiments of the present invention. The waveguide 402 can be a waveguide of an optical bus of a multi-bus fabric described above with five of n−2 optical taps 404-408 and two mirrors 410 and 411 represented. Node 412 outputs an optical signal 414 with optical power P to the waveguide 402. The optical signal can be generated by driving a source of a transmitter of the node 412, as described above with reference to FIG. 2. The optical taps are configured so that each node receives a reflected portion of the optical signal with an approximate optical power $P/(n-1)$.

The optical taps denoted by $OT_m$ in FIG. 4 reflect a fraction of the optical signal power to an optically coupled node in accordance with:

$$R_m \approx \frac{1}{(n-m+2)}$$

and transmit a fraction of the optical signal power in accordance with:

$$T_m \approx \frac{(n-m+1)}{(n-m+2)}$$

Thus, an optical tap $OT_m$ receives an optical signal with optical power P from a broadcasting node and outputs a reflected portion with optical power $PR_m$ toward an optically coupled node and outputs a transmitted portion with optical power $PT_m$, where $P = PR_m + PT_m + L_m$ with $L_m$ representing the optical power loss at the optical tap $OT_m$ due to absorption, scattering, or misalignment. For a general description of broadcasting an optical signal with substantially the same optical power to a number of nodes over a single waveguide. In other embodiments, the optical buses of a one-dimensional multi-bus fabric can be implemented using star couplers. For example, each optical bus of the multi-bus fabric 102 can be implemented using 12 star couplers. In FIG. 3, a star coupler comprises one input port that carries one of the optical signals 124 and three output ports, each output port carriers one of the optical signals 126-128. Each star coupler can be configured so that an optical signal received in the input port is split into three output optical signals, each output optical signal carrying approximately ⅓ of the optical power of the input optical signal.

The waveguides of the optical buses 104-107 can be optical fibers, optical waveguides or hollow waveguides. A hollow waveguides is composed of a tube with an air core. The structural tube forming the hollow waveguide can have inner core materials with refractive indices greater than or less than one. The tubing can be composed of a suitable metal, glass, or plastic and metallic and dielectric films can be deposited on the inner surface of the tubing. The hollow waveguides can be hollow metal waveguides with high reflective metal coatings lining the interior surface of the core. The air core can have a cross-sectional shape that is circular, elliptical, square, rectangular, or any other shape that is suitable for guiding light. Because the waveguide is hollow, optical signals can travel along the core of a hollow waveguide with an effective index of about 1. In other words, light propagates along the core of a hollow waveguide at the speed of light in air or vacuum.

The example shown in FIG. 1 represents a one-dimensional multi-bus fabric for interconnecting nodes. In general, a one-dimensional multi-bus fabric for interconnecting n nodes comprises n optical buses. Each optical bus is driven by one node, and each node can receive broadcast optical signals on the other n−1 optical buses. In addition, a one-dimensional multi-bus fabric corresponds to n transceivers, or in other words, n transmitters and $n^2-n$ receivers. However, it is desirable to limit n due to power constraints in fan-out optical buses and because of the square growth in receivers per transceiver.

Figure 5:
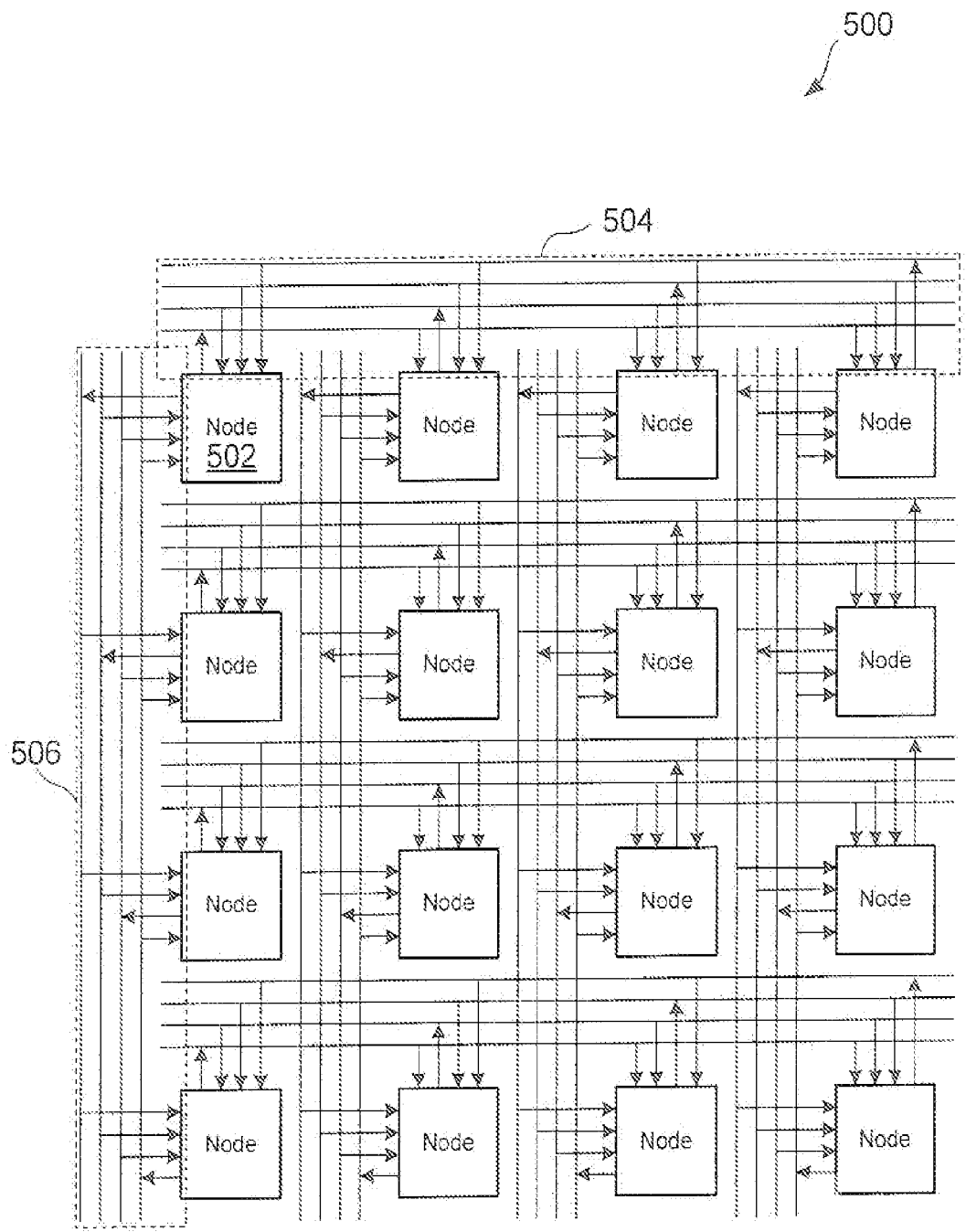
FIG. 5 shows a schematic representation of an example two-dimensional multi-bus fabric configured in accordance with embodiments of the present invention.

Two-dimensional arrangements of nodes, on the other hand, can limit optical bus fan-out and reduce the number of receivers per transceiver. FIG. 5 shows a schematic representation and an example of a two-dimensional multi-bus fabric 500 for interconnecting 16 nodes in accordance with embodiments of the present invention. As shown in FIG. 5, the multi-bus fabric 500 comprises eight separate one-dimensional multi-bus fabrics configured as described above with reference to FIGS. 1-3, and each node is in optical communication with two one-dimensional multi-bus fabrics. For example, node 502 is in optical communication with a one-dimensional multi-bus fabric identified by dashed-line enclosure 504 and a one-dimensional multi-bus fabric identified by dashed-line enclosure 506. In order to implement the two-dimensional multi-bus fabric 500, each node is configured with two transceivers that are configured and operated as described above with reference to FIG. 2.

Figure 6:
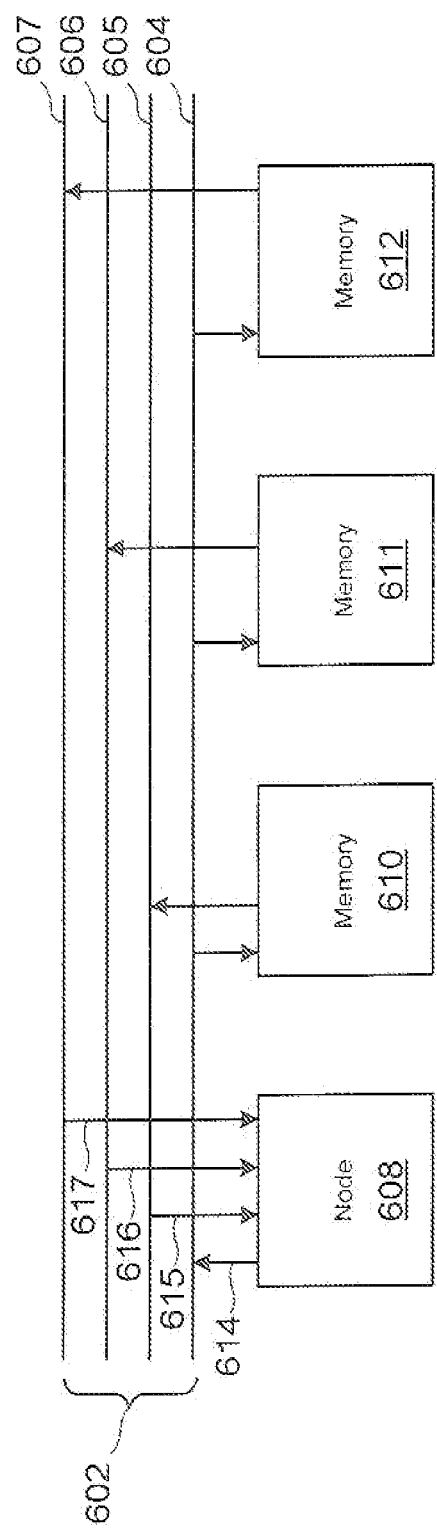
FIG. 6 shows a schematic representation of an example one-dimensional memory fabric configured in accordance with embodiments of the present invention.

Optical fabric embodiments of the present invention also include optical memory fabrics for interconnect expansion memory to nodes. FIG. 6 shows a schematic representation of an example one-dimensional memory multi-bus fabric 602 configured in accordance with embodiments of the present invention. The memory fabric 602 comprises four optical buses 604-607 that provide optical communication between a node 608 and three expansion memory devices 610-612.

Directional arrows 614-617 between the node and the optical buses 604-607 represent separate optical signals, and directional arrows between the memory devices 610-612, such as arrows 618 and 619, also represent separate optical signals. The optical bus 604 is configured to broadcast the optical signals to each of the expansion memory devices 610-612 in the same manner the node 108 broadcast optical signals to nodes 109-111 described above with reference to FIGS. 1-3. Expansion memory devices 610-612 send optical signals to node 608 over optical buses 605-607, respectively. The node 608 converts the optical signals into electronic signals for processing.

Figure 7:
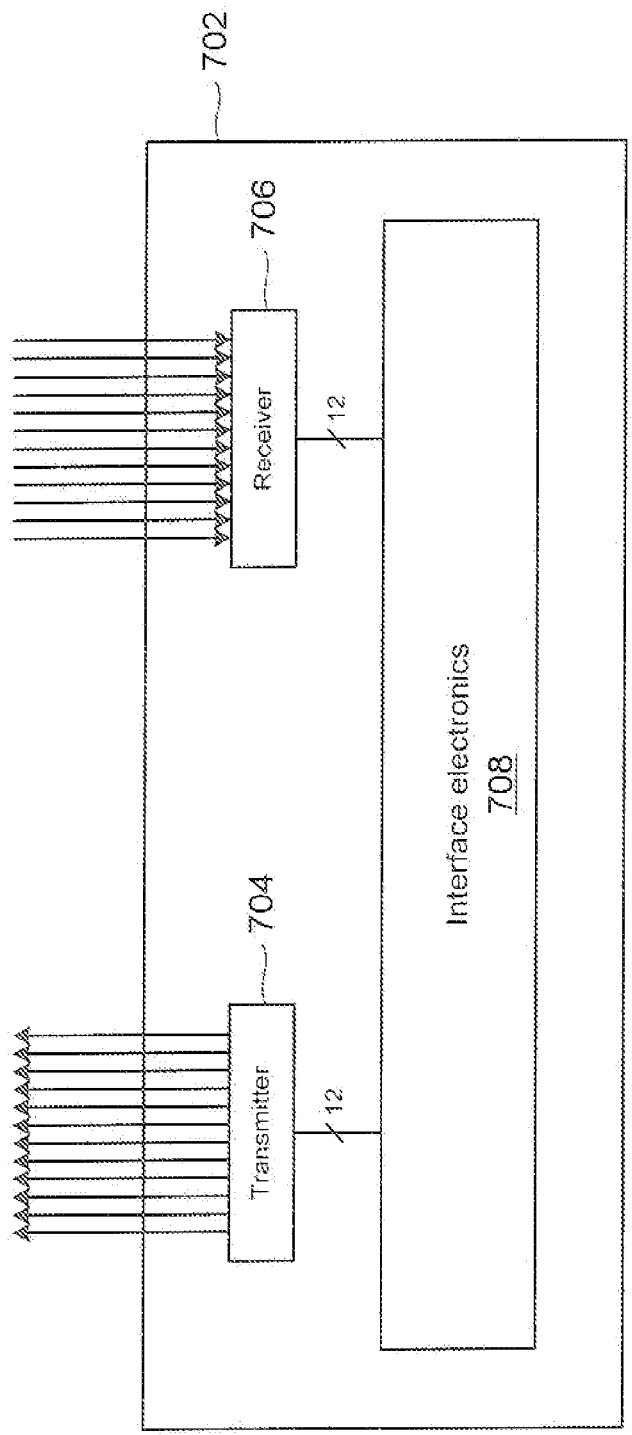
FIG. 7 shows a schematic representation of an example transceiver for an expansion memory device configured in accordance with embodiments of the present invention.

The node 608 includes the same transceiver described above with reference to FIG. 2. FIG. 7 shows a schematic representation of an example transceiver 702 for the expansion memory devices 610-612 configured in accordance with embodiments of the present invention. The transceiver 702 comprises a transmitter 704, a receiver 706, and interface electronics 708. In the example shown in FIG. 7, the transmitter 704 comprises an array of 12 light-emitting sources, such as VCSELs, each of which is separately controlled by the interface electronics 708 to emit an optical signal into a separate waveguide. The receiver 706 comprises an array of 12 pn junction or p-i-n junction photodetectors and receiver integrated circuits which perform the optical to electrical conversion. Interface electronics 708 electronically couple the transmitter 704 and the receiver 706 to the electronic components of the memory. The transmitter 704 and receiver 706 are operated in the same manner as the transmitter 204 and receivers 205-207 described above with reference to FIGS. 2 and 3.

Figure 8:
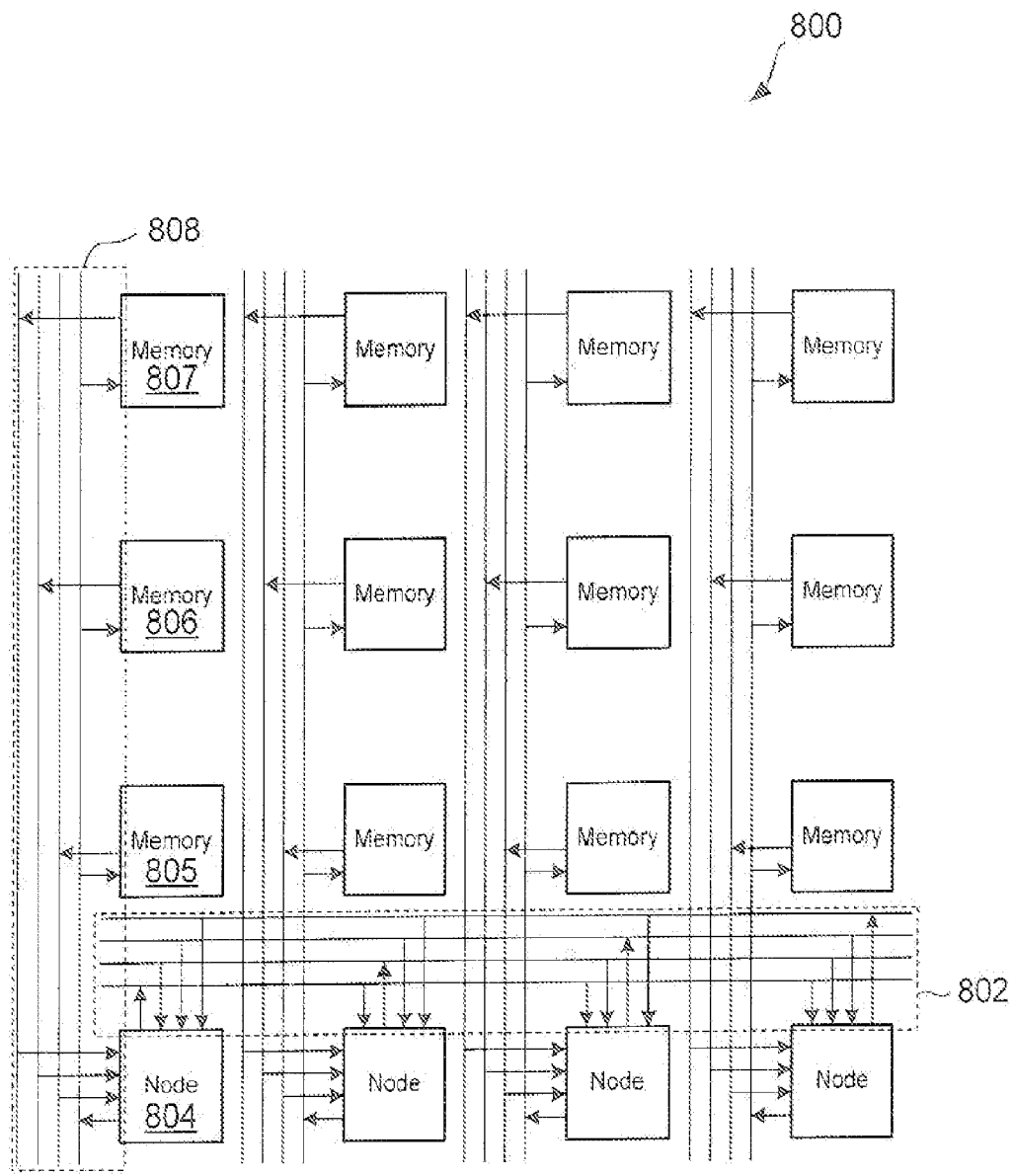
FIG. 8 shows a schematic representation of an example two-dimensional memory fabric configured in accordance with embodiments of the present invention.

The example shown in FIG. 6 represents a memory multi-bus fabric for interconnecting a node with three expansion memory devices. Like the two-dimensional multi-bus fabric expansion described above with reference to FIG. 5, memory expansion can also be treated as an additional dimension. FIG. 8 shows a schematic representation and an example of a two-dimensional memory fabric 800 for interconnecting 4 nodes and 12 expansion memory devices in accordance with embodiments of the present invention. The two-dimensional memory fabric 800 comprises four one-dimensional memory multi-bus fabrics and one one-dimensional multi-bus fabric. The four nodes are in optical communication via the multi-bus fabric identified by a dashed-line enclosure 802, as described above with reference to FIGS. 1-3. In addition, each node is in optical communication with three expansion memory devices via one of the four memory multi-bus fabrics. For example, node 804 is optically coupled expansion memory devices 805-807 via a memory multi-bus fabric identified by a dashed-line enclosure 808. In order to implement the two-dimensional multi-bus fabric 800, each node is configured with two transceivers that are configured and operated as described above with reference to FIG. 2.

Optical signals generated by the nodes and the expansion memory devices can be in the form of packets that include headers. Each header identifies a particular node or expansion memory device as the destination for the data encoded in the optical signals. For example, when the node 108 sends optical signals directed to one of the nodes 109-111, shown in FIG. 1, the optical signals are broadcast to the nodes 109-111 over the same optical bus 104. However, because the header of each packet identifies the particular node as the destination of the data, only the node identified by the header actually processes the optical signals. The other nodes also receive the optical signals, but because they are not identified by the header they can discard the data encoded in the optical signals.

Implementations

Figure 9:
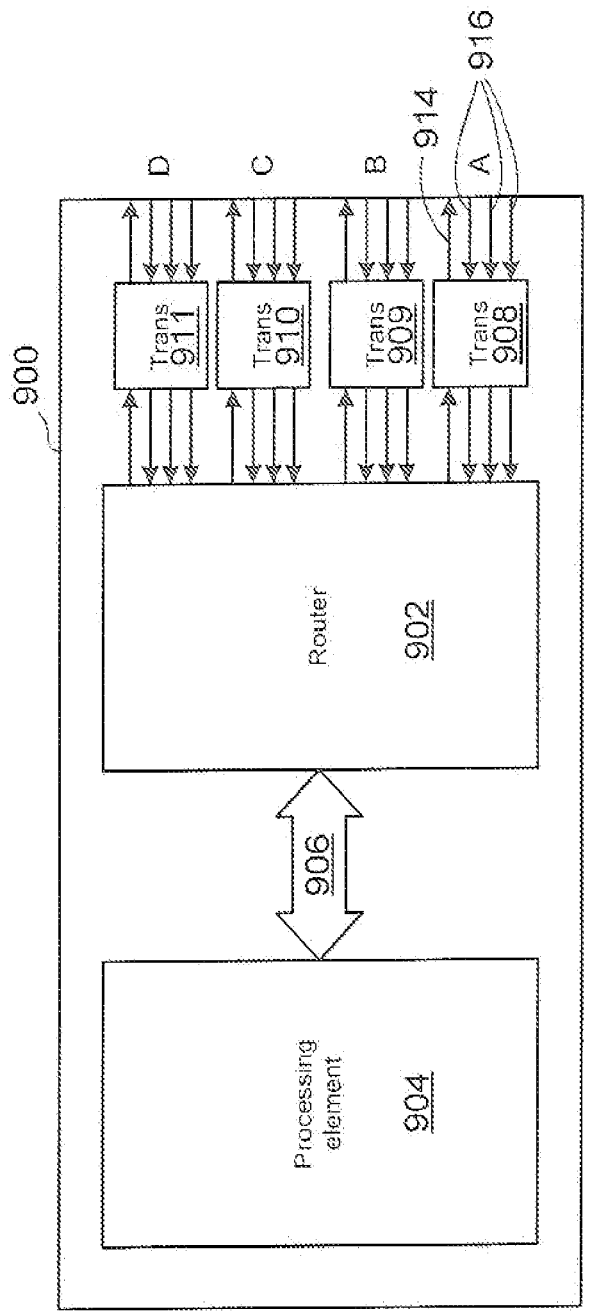
FIG. 9 shows an example of a single-socket processor board configured in accordance with embodiments of the present invention.

FIG. 9 shows an example single-socket processor board 900 configured in accordance with embodiments of the present invention. The processor board 900 includes a router 902 and a processing element 904 in electronic communication via bi-directional communication links 906 imprinted on the board 900. The processing element 904 can be a single processor or a multi-core processor and includes local memory. In this embodiment, the processor board 900 includes four transceivers 908-911 that are in electronic communication with router 902 and in optical communication with fabric ports A-D, respectively. The four fabric ports A-D form a single socket for optical connections with other devices. The transceivers 908-911 are configured as described above with reference to FIG. 2. For example, in fabric port A, directional arrow 914 represents a number of waveguides emanating from corresponding lasers in a transmitter, and directional arrows 916 each represent a number of waveguides that carrier optical signals to photodetectors of three corresponding receivers. In other embodiments, the number of transceivers can range from as few as one to as many 5, 6, 7 or more. The number of fabric ports per socket determines the potential dimensionality and versatility of a multi-bus fabric for a scalable computer system comprising numerous processor boards as described below. In other embodiments, the transceivers can be integrated within the electronic components of the router 902, as described above with reference to FIGS. 1-8.

Figure 10:
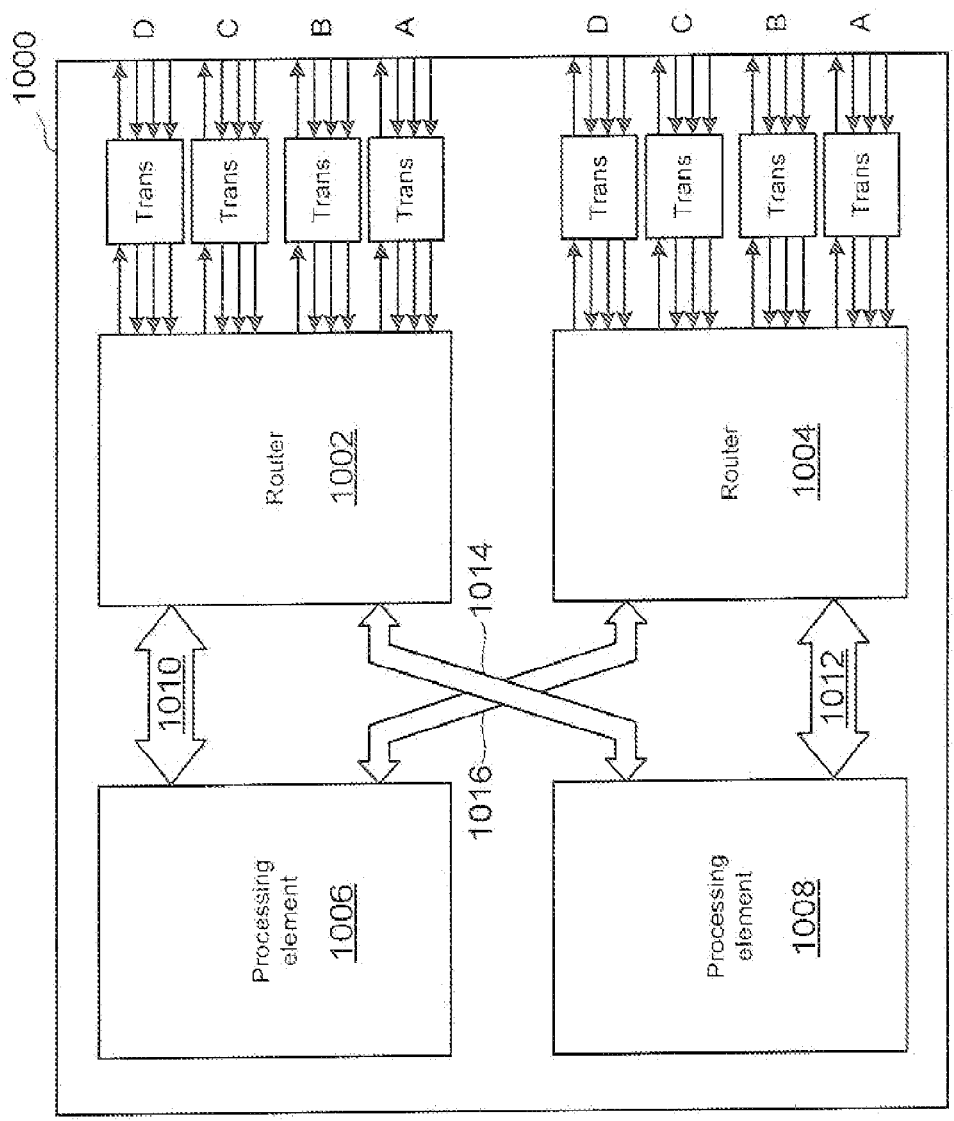
FIG. 10 shows an example of a dual-socket processor board configured in accordance with embodiments of the present invention.

FIG. 10 shows an example dual-socket processor board 1000 configured in accordance with embodiments of the present invention. The processor board 1000 includes two routers 1002 and 1004 and two processing elements 1006 and 1008. The processing elements 1006 and 1008 can be multi-core processors with local memory. The processing element 1006 is in electronic communication with the router 1002 via bi-directional communication links 1010, and the processing element 1008 is in electronic communication with the router 1004 via bi-directional communication links 1012. The processing board 1000 is also configured with two additional bi-directional communication links 1014 and 1016 providing electronic communication between the processing element 1006 and the router 1004 and between the processing element 1008 and the router 1002, respectively. As shown in FIG. 10, the processing board 1000 includes two sets of four transceivers, each set with fabric ports labeled A-D, as described above with reference to FIG. 9. Each set of fabric ports forms a socket. Thus, board 1000 is referred to as dual-socket processor board.

Figure 11:
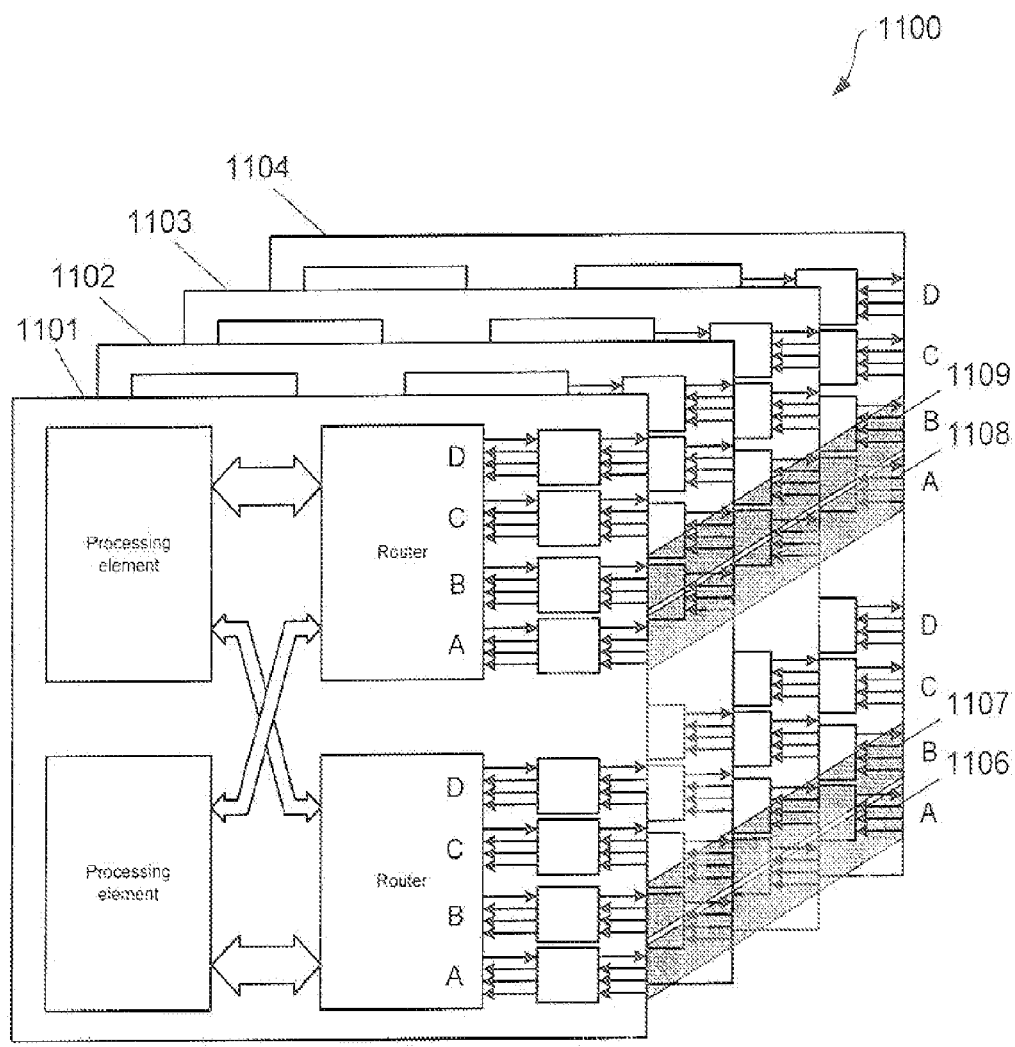
FIG. 11 shows an isometric view and schematic representation of an example eight socket computer system configured in accordance with embodiments of the present invention.

In accordance with embodiments of the present invention, the multi-bus fabrics described above with reference to FIGS. 1-8 can be used to form one-, two-, and higher dimensional computer systems comprising any number of single- or dual-socket processor boards. FIG. 11 shows an isometric view and schematic representation of an example eight socket computer system 1100 configured in accordance with embodiments of the present invention. The eight socket system 1100 comprises four processor boards 1101-1104 in optical communication via four separate multi-bus fabrics 1106-1109. In the example of FIG. 11, the processor boards 1101-1104 are configured in the same manner as the processor board 1000. The multi-bus fabrics are configured and operated as described above with reference to FIGS. 1-3 and optically coupled to the A and B fabric ports. Each multi-bus fabric provides the same optical communication described above with reference to FIGS. 1-3. The processor boards 1101-1104 can be mounted in a cabinet or chassis. Multi-bus fabrics 1106-1109 can be implemented in the cabinet backplane. Each processor board is inserted into the cabinet with the A and B fabric ports inserted into corresponding receptacles in the multi-bus fabrics 1106-1109.

Computer system embodiments are not limited to four dual-socket processor boards. In other embodiments, the one-dimensional multi-bus fabrics can be used to form two-dimensional multi-bus fabrics for large scale computer systems. The single-socket and dual-socket boards described above include additional fabric ports C and D that can be used to increase the number of processor boards in the computer systems. For example, the multi-bus fabrics can be configured to combine multiple eight socket systems to form larger computer systems.

Figure 12:
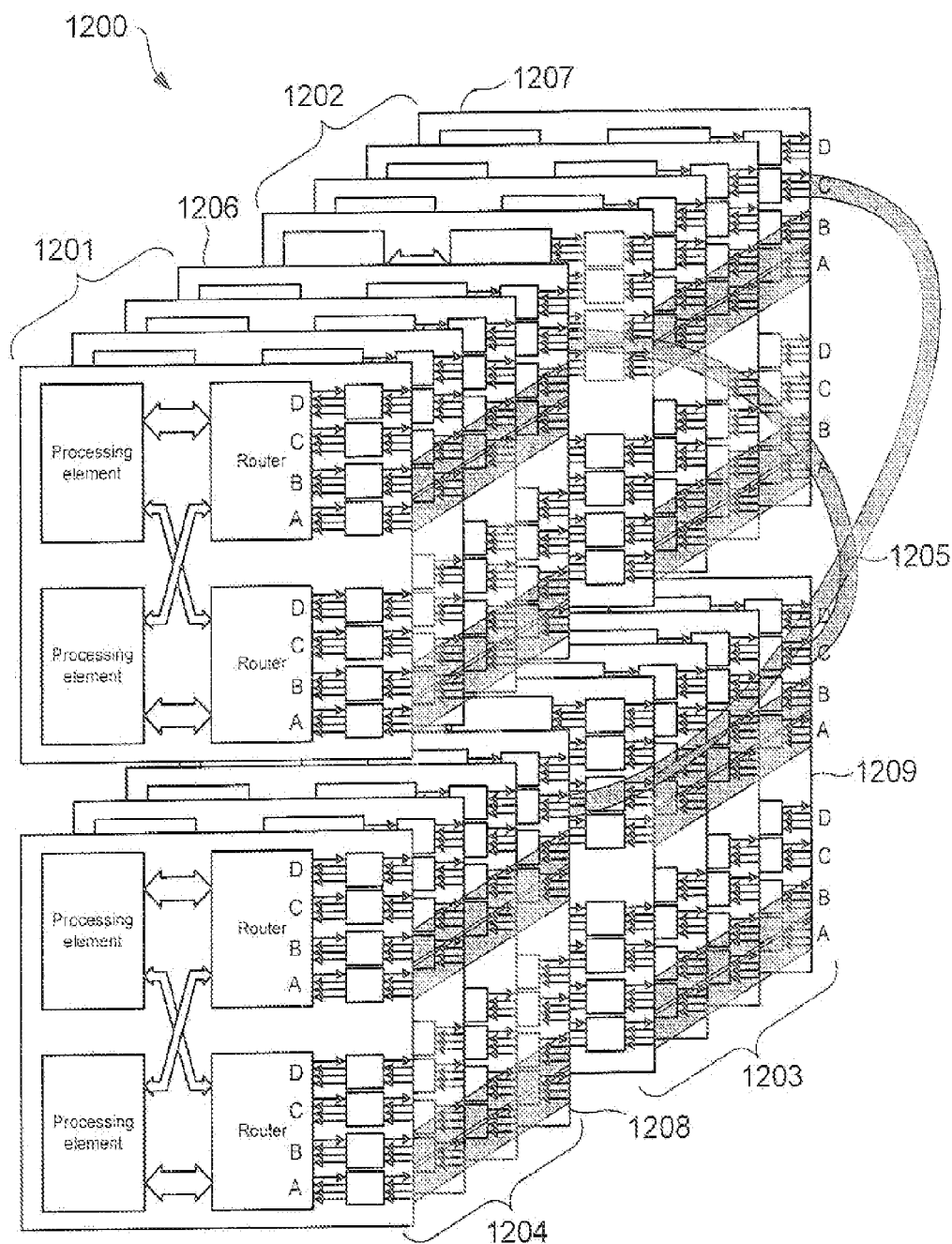
FIG. 12 shows an isometric view and schematic representation of an example thirty-two socket computer system configured in accordance with embodiments of the present invention.

FIG. 12 shows an isometric view and schematic representation of an example 32 socket computer system 1200 configured in accordance with embodiments of the present invention. The socket system 1200 comprises four eight socket computer systems 1201-1204, each eight socket computer system is configured and optically interconnected using four multi-bus fabrics as described above with reference to FIG. 11. The fabric ports C of the dual socket boards are used to optically couple the eight socket systems to one another. For example, 4-way optical star coupler 1205 can be used to optically couple all four dual socket boards 1206-1209. The 4-way optical coupler 1205 enables the boards 1206-1209 to exchange optical signals. For example, optical signals output from fabric port C of board 1207 are split into four substantially identical sets of the same optical signals that are input to corresponding fabric ports C of the boards 1206, 1208, and 1209. The 4-way optical coupler 1205 enables each of the boards 1206, 1208, and 1209 to send optical signals to the other three boards in the same manner. The optical coupler 1205 can be replicated at most 15 more times for all C and D fabric ports to give full bandwidth communication. The processor boards 1101-1104 can be mounted in a cabinet or chassis. The four multi-bus fabrics optically connecting the boards in each eight socket system and the 4-way optical couplers form a two-dimensional multi-bus fabric that can be implemented in the backplane of the cabinet.

Figure 13:
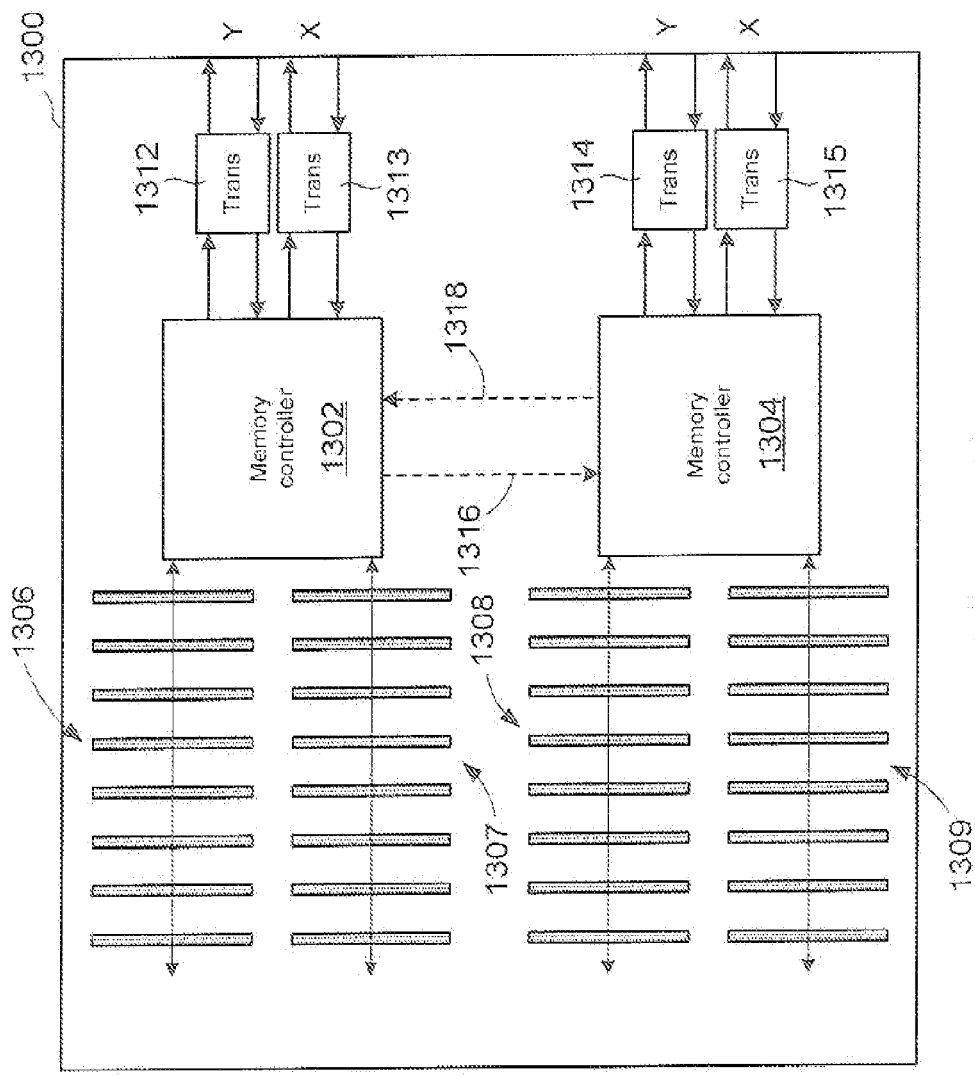
FIG. 13 shows an example of a memory expansion board configured in accordance with embodiments of the present invention.

In other embodiments, the C fabric ports may be used to provide the second dimension of optical communication between dual-socket boards of the eight socket systems, and the D fabric ports may be used to provide optical communication with other devices, such as expansion memory boards. FIG. 13 shows an example memory expansion board 1300 configured in accordance with embodiments of the present invention. The board 1300 comprises two memory controllers 1302 and 1304, memory 1306-1309, and four transceivers 1312-1315. Memory 1306-1309 are each composed of eight Dual In-line Memory Modules ("DIMMs"), and transceivers 1312-1315 are configured as described above with reference to FIG. 7, and are in optical communication with fabric ports labeled X and Y. As shown in FIG. 13, the memory controller 1302 is in electronic communication with memory 1306 and 1307 and transceivers 1312 and 1313, and the memory controller 1304 is in electronic communication with memory 1308 and 1309 and transceivers 1314 and 1315. The memory controllers 1302 and 1304 manage the flow of data between the transceivers and the memory. In other embodiments, the memory controllers 1302 and 1304 can be in electronic communication with each other via bi-directional communication links 1316 and 1318 in order to coordinate storage of and access to stored data.

Figure 14:
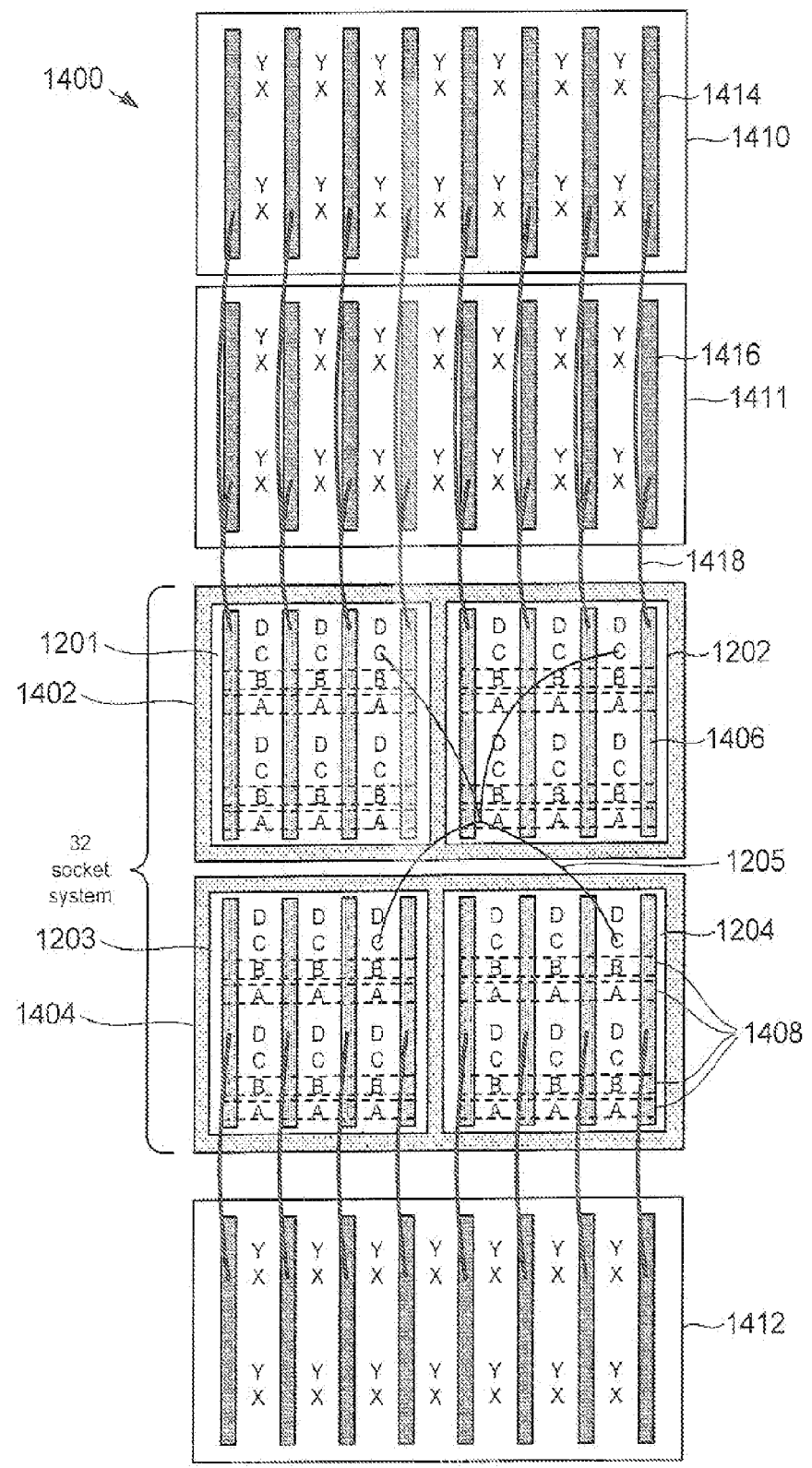
FIG. 14 shows an end-on view of an example computer system with memory expansion configured in accordance with embodiments of the present invention.

Expansion memory boards can be rack mounted and placed into optical communication with single and dual-socket systems described above using memory multi-bus fabrics. FIG. 14 shows an end-on view of an example computer system 1400 with memory expansion configured in accordance with embodiments of the present invention. Center shelves 1402 and 1404 house the 32 socket system 1200 shown in FIG. 12. In particular, shelf 1402 houses socket systems 1201 and 1202 and shelf 1404 houses socket systems 1203 and 1204, with dual socket boards represented by rectangles, such as rectangle 1406. Dashed-line rectangles 1408 identify the multi-bus fabrics used to optically couple the A and B fabric ports of the dual socket boards within the same socket system, as described above with reference to FIG. 11. C fabric ports of the dual socket boards are used to provide a second dimension of optical communication between the four socket systems 1201-1204 using star couplers, such as star coupler 1205 described above with reference to FIG. 12. Note that in order to avoid cluttering FIG. 14 only one star coupler 1205 is shown. Shelves 1410-1412 each house eight memory expansion boards, such as expansion memory board 1414. In the example show in FIG. 14, D fabric ports of the dual socket boards provide an additional dimension for memory expansion. The memory expansion boards can be optically coupled to D fabric ports of the dual socket boards via memory multi-bus fabrics. For example, as shown in FIG. 14, memory expansion boards 1414 and 1416 are optically coupled to dual-socket board 1406 via optical bus 1418, as described above with reference to FIG. 6.

Multi-bus fabrics of the present invention offer a number of advantages over other optical interconnect systems. The multi-bus fabrics allow large numbers of processing elements to be connected at low latency, and memory can be scaled efficiently in terms of power and without adding significant latency. In general, when multi-bus fabrics are compared to other optical interconnects, multi-bus fabrics have fewer transmitters than photodetectors per node, a lower average optical hop count, and lowest worst case optical hop count. Some advantages of having fewer transmitters than photodetectors per node are that photodetectors typically have lower power consumption and higher reliability than transmitters. Thus, multi-bus fabrics of the present invention provide better reliability and lower power consumption when the connection count (i.e., total number of transmitters and receivers) is the same as other optical interconnect systems.

Figure 15:
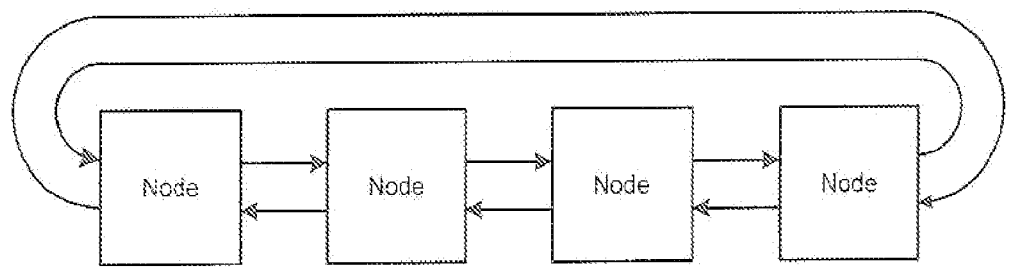
FIG. 15 shows an example of a ring-based optical interconnect for a one-dimensional arrangement of four nodes of computer system.
Figure 16:
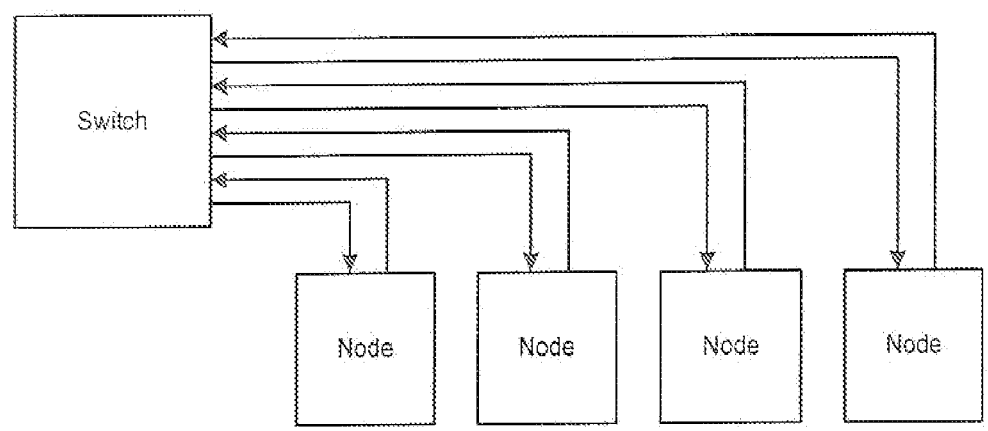
FIG. 16 shows an example of a switch-based optical interconnect of four nodes of a computer system.

FIG. 15 shows an example ring-based optical interconnect for an arrangement of four nodes of computer system, and FIG. 16 shows an example switch-based optical interconnect also of four nodes of a computer system. Table I compares performance parameters of the multi-bus fabric 102, shown in FIG. 1, with the ring and switch-based interconnects shown in FIGS. 15 and 16.

TABLE I

| 4 nodes | Ring | Multi-bus | Switch |
| --- | --- | --- | --- |
| Transmitters/node | 2 | 1 | 2 |
| Receivers/node | 2 | 3 | 2 |
| Optical connections/node | 4 | 4 | 4 |
| Ave. optical hops | 1 | 0.75 | 1.5 |
| Worst case optical hops | 2 | 1 | 2 |

Table I reveals that although the multi-bus fabric 102 has more receivers, it has fewer transmitters. Table I also reveals that the multi-bus fabric 102 has fewer average optical hops and a lower number of worst case optical signal hops.

Figure 17:
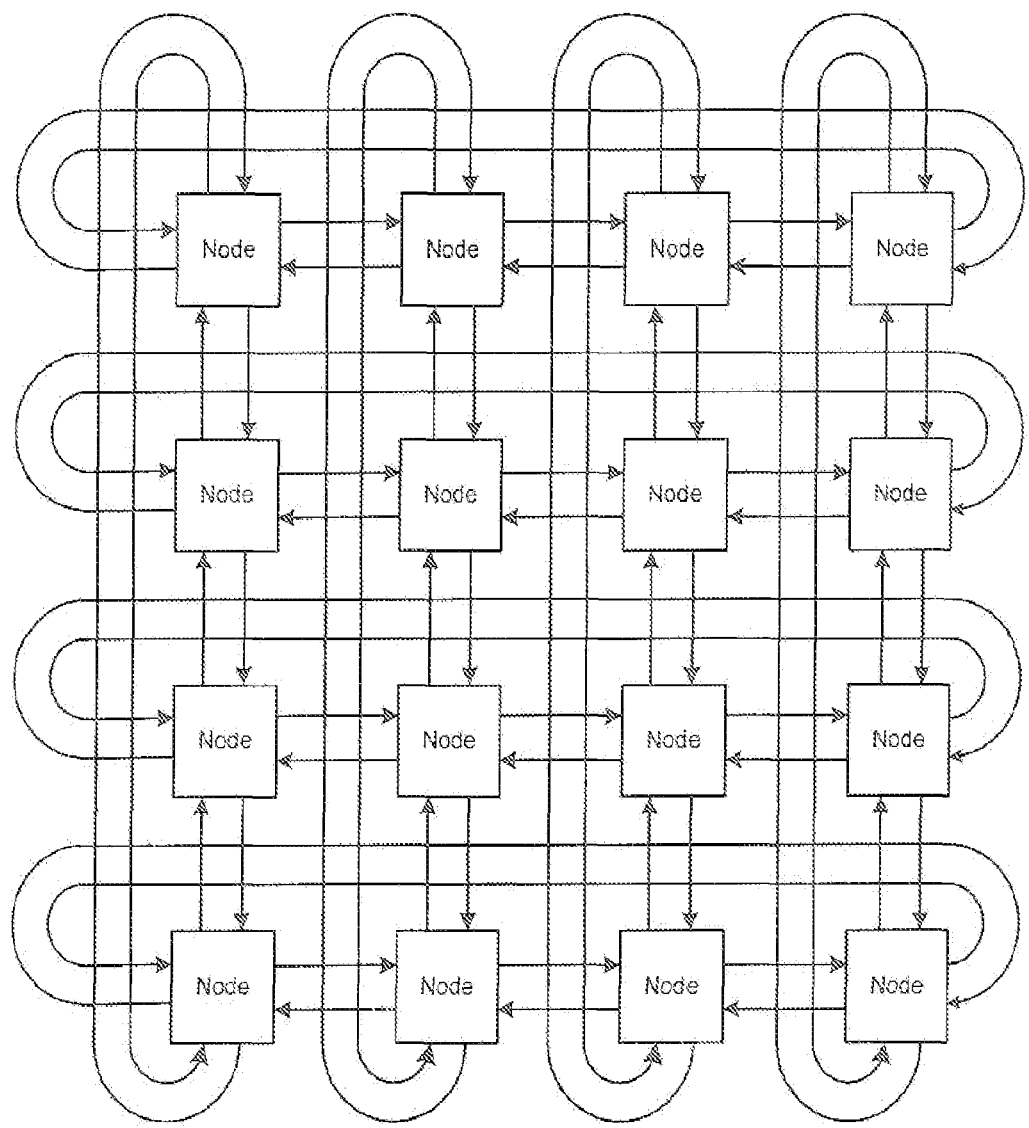
FIG. 17 shows an example of a torus-based optical interconnect for sixteen nodes of a computer system.
Figure 18:
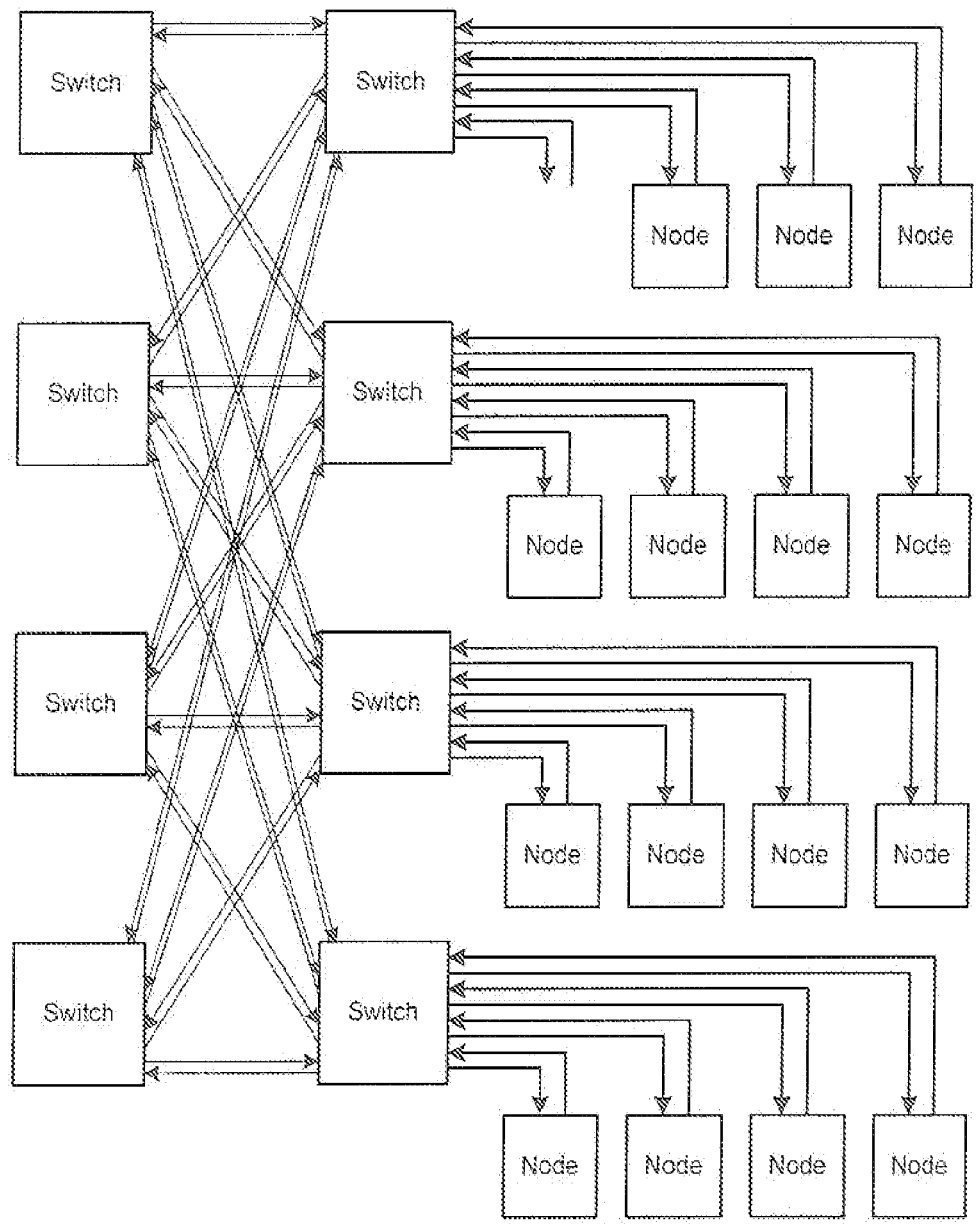
FIG. 18 shows an example of a two-layer switch-based optical interconnect of a sixteen node computer system.

FIG. 17 shows an example torus-based optical interconnect for an arrangement of sixteen nodes of a computer system, and FIG. 18 shows an example two-layer switch-based optical interconnect for sixteen nodes of a computer system. Table II compares performance parameters of the multi-bus fabric 500, shown in FIG. 5, with the ring and switch-based interconnects shown in FIGS. 17 and 18.

TABLE II

| 16 nodes | Ring | Multi-bus | Switch |
| --- | --- | --- | --- |
| Transmitters/node | 4 | 2 | 4 |
| Receivers/node | 4 | 6 | 4 |
| Ave. optical hops | 2 | 1.5 | 3.375 |
| Worst case optical hops | 4 | 2 | 4 |

Again, even though the fabrics have been scaled up to handle a larger number of nodes, Table II reveals that the multi-bus fabric 500 has more receivers, but fewer transmitters. Table II also reveals that the multi-bus fabric 500 maintains fewer average optical hops and a lower number of worst case optical hops.

Table III compares performance parameters of a multi-bus fabric for a 64 node three-dimensional computer system with analogous ring and switch-based systems.

TABLE III

| 64 nodes | Ring | Multi-bus | Switch |
| --- | --- | --- | --- |
| Transmitters/node | 6 | 3 | 6 |
| Receivers/node | 6 | 9 | 6 |
| Ave. optical hops | 3 | 2.25 | 5.34 |
| Worst case optical hops | 6 | 3 | 6 |

Table III reveals that the multi-bus fabric again has more receivers per node, but fewer transmitters, and that the multi-bus fabric maintains fewer average optical hops and a lower number of worst case optical hops.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A multi-bus fabric, comprising:
a plurality of optical buses, wherein each optical bus is optically coupled to each node of the plurality of nodes, each optical bus is associated with one node of the plurality of nodes, and each optical bus only transmits optical signals broadcast by its associated node to the other nodes of the plurality of nodes.

2. The multi-bus fabric of claim 1 wherein each optical bus of the plurality of optical buses further comprises:
a plurality of waveguides wherein each waveguide is to carry one of the optical signals generated by one of the nodes; and
a plurality of optical taps optically coupled to each waveguide, wherein the optical taps optically coupled to a waveguide are to direct portions of the optical signal carried by the waveguide to one of the other nodes.

3. The multi-bus fabric of claim 2 wherein the waveguides include at least one of hollow waveguides and optical fibers.

4. The multi-bus fabric of claim 2 wherein wavelength division multiplexing is used to inject each optical signal generated by one of the nodes into each of the plurality of waveguides.

5. The multi-bus fabric of claim 1 wherein each optical bus of the first set of optical buses is to broadcast optical signals generated by one node to the other nodes, each optical bus of the first set of optical buses being configured so that each of the other nodes receive the same optical signals with approximately the same optical power.

6. The multi-bus fabric of claim 1 wherein the nodes further comprise routers and processing elements.

7. A multi-bus fabric, comprising:
a first optical bus optically coupled to a node and each memory device of a plurality of memory devices, wherein the first optical bus carries optical signals broadcast by the node to the memory devices; and
a set of optical buses, wherein each optical bus of the set of optical buses is optically coupled to the node and one memory device of the plurality of memory devices, and each memory device sends optical signals generated by the memory device to the node over the optically coupled optical bus of the set of optical buses.

8. The multi-bus fabric of claim 7 wherein the first optical bus further comprises:
a plurality of waveguides wherein each waveguide is to carry one of the optical signals generated by the nodes; and
a plurality of optical taps optically coupled to each waveguide, wherein the optical taps optically coupled to a waveguide are to direct portions of an optical signal generated by the node to each of the memory devices.

9. The multi-bus fabric of claim 8 wherein the waveguides include at least one of a hollow waveguide and an optical fiber.

10. The multi-bus fabric of claim 7 wherein each optical bus of the set of optical buses further comprises:
a plurality of waveguides, wherein each waveguide is to carry one of the optical signals generated by one of the plurality of memory devices; and
a plurality of optical taps optically coupled to each waveguide, wherein the optical taps optically coupled to a waveguide are to direct the optical signal generated by the memory device to the node.

11. The multi-bus fabric of claim 7, wherein the first optical bus is to broadcast the optical signals to the memory devices with approximately the same optical power.

12. A system comprising:
a plurality of nodes; and
a plurality of multi-bus fabrics, wherein each multi-bus fabric is to provided optical communication between two or more nodes, and each node is to optically couple with two or more multi-bus fabrics, wherein each node broadcasts optical signals to and receives optical signals broadcast from two or more nodes over the two or more multi-bus fabrics optically coupled to the node.

13. The system of claim 12 wherein each multi-bus fabric further comprises a plurality of optical buses optically coupled to one or more nodes, and each optical bus is to receive a plurality of optical signals generated by one of the one or more nodes and broadcast the plurality of optical signals to the other nodes optically coupled to the optical bus.

14. The system of claim 12 further comprising:
   a plurality of memory devices; and
   a plurality of memory multi-bus fabrics, wherein the memory multi-bus fabrics optically couple one or more memory devices to one of the nodes such that the node broadcast optical signals to the one or more memory devices and each of the memory devices sends optical signals directly to the node.

15. The system of claim 14 wherein the memory multi-bus fabrics further comprise a plurality of optical buses optically coupled to the node and one or more memory devices such that one of the optical buses is to receive a plurality of optical signals generated by the node and broadcast the plurality of optical signals to the one or more memory devices, and each of the other optical buses is configured to receive a plurality of optical signals generated by one of the memory devices and transmit the optical signals to the node.

* * * * *